United States Patent [19]

Brown, Jr.

[11] 4,188,829
[45] Feb. 19, 1980

[54] FLEXURE PIVOT ACCELEROMETER

[75] Inventor: Milton R. Brown, Jr., Riverside, Calif.

[73] Assignee: Bourns, Inc., Riverside, Calif.

[21] Appl. No.: 954,504

[22] Filed: Oct. 25, 1978

[51] Int. Cl.² .............................................. G01P 5/12
[52] U.S. Cl. ................................................ 73/517 R
[58] Field of Search ............ 73/517 R, 517 B, 382 R, 73/654, 517 A, 517 AV, 1 D

[56] References Cited

U.S. PATENT DOCUMENTS

| 3,240,073 | 3/1966 | Pitzer | 73/517 R |
| 3,713,088 | 1/1973 | Lehner et al. | 73/517 R X |

Primary Examiner—Jerry W. Myracle
Attorney, Agent, or Firm—William G. Becker

[57] ABSTRACT

A pendulous, linear accelerometer having its sensitive pendulous mass assembly mounted in its casing structure by means of a pair of flexure pivot bearings. The relatively long dimension of each flexure pivot, the wide separation of the flexure pivot pairs, and the inherent cross-axis rigidity of the flexure pivots provide high resistance to cross-axis vibrations. The spherically-shaped edge surface of the cylindrical pendulous mass provides a constant annular fluid flow passageway to the trapped air (or other fluid) behind the mass during its rotary movements in response to applied accelerations along its sensitive axis. The volume of trapped fluid coupled with the resistance provided by the passageway provides critical damping for the instrument.

1 Claim, 3 Drawing Figures

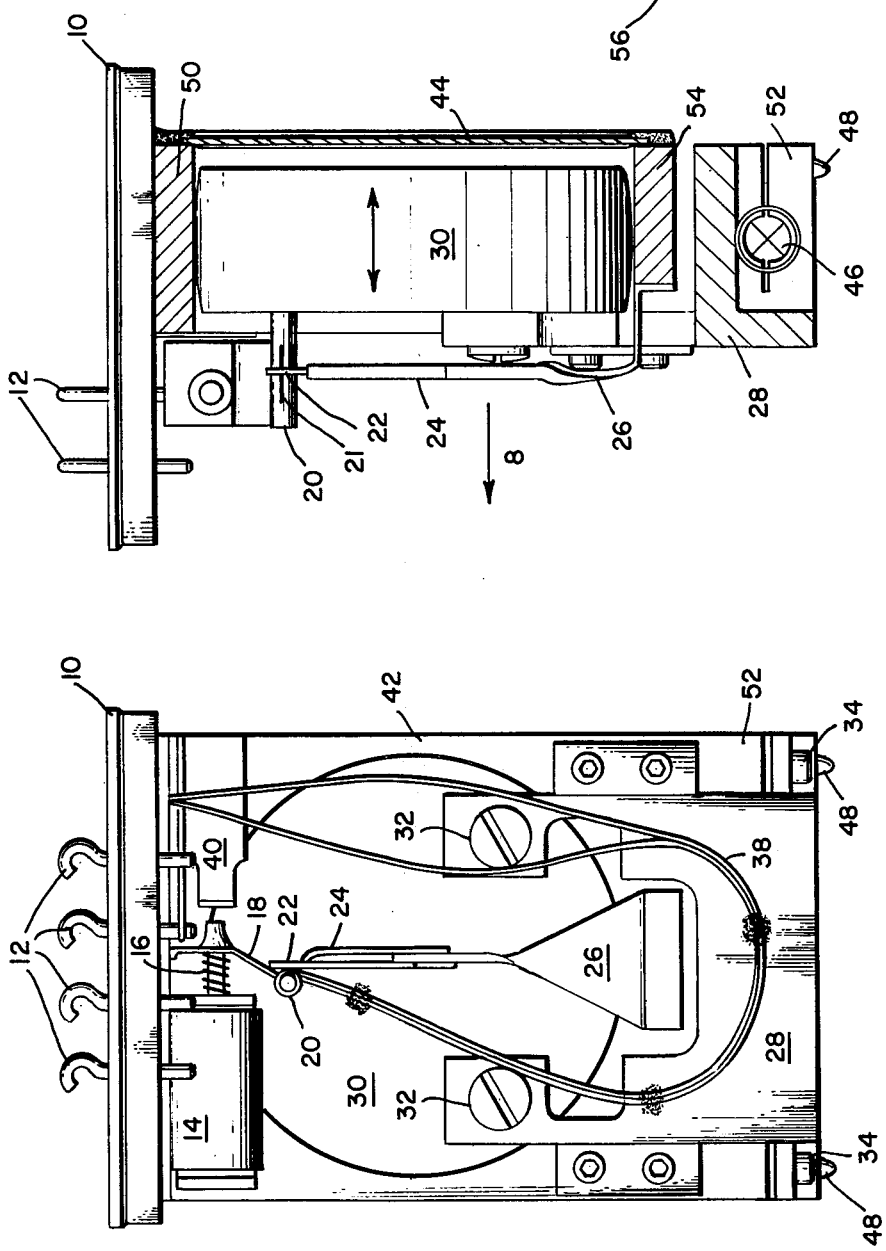

4,188,829

FLEXURE PIVOT ACCELEROMETER

BACKGROUND OF THE INVENTION

1. Field of the Invention

This invention relates generally to pendulous linear accelerometers and more particularly to the dual use of flexure pivots to serve the purposes of bearings for supporting the sensitive pendulous mass and also as the calibrated force spring for the system of the accelerometer.

2. Description of the Prior Art

Accelerometers are known in which a pendulous mass is mounted in a support such that a movement of the support coupled with the inertia of the mass causes a relative displacement between the pendulous mass and the support. An output signal may be derived from this relative displacement so as to relate to the force, and thus the acceleration, causing the initial movement. The simple accelerometer thus portrayed is beset with many difficulties among which reliable and maintained calibration is one of the most important and troublesome. For example, subsequent to the experience of an acceleration causing the relative displacement mentioned between the pendulous mass and the support, how can the prior spatial relationship be restored? If this problem is not solved, it is difficult to determine the value of the acceleration involved since the "at-rest" positions of the elements of the accelerometer are not known with any degree of certainty. It is also necessary to eliminate the effects of accelerations and disturbing vibrations incident at cross-axes.

There is, therefore, a continuing requirement in the art for improved pendulous accelerometers that provide some alleviation in respect to the shortcomings mentioned above, among others.

It would thus be a great advantage to the art to provide a reliable pendulous linear accelerometer that is easy to calibrate and that will hold that calibration for a relatively long period of time.

Another great advantage to the art would be the provision of such a reliable accelerometer in an economical package.

A further desirable advantage to the art would be the provision of such an accelerometer exhibiting, in addition to its other advantages, a high degree of cross-axis rigidity.

SUMMARY OF THE INVENTION

It is an object of the present invention to provide a reliable pendulous linear accelerometer that is simple and easy to calibrate.

It is a further object of the present invention to provide such an accelerometer in an economical package.

It is a still further object of the invention to provide a linear accelerometer that has a high degree of resistance to cross-axis accelerations.

In the accomplishment of these and other objects, a pendulous linear accelerometer is provided in which a minimum number of parts of optimized dimensions, shapes, proportions and spatial dispositions is employed. The pendulous mass is a short cylinder with most of its mass symmetrically distributed about its center of gravity, which center of gravity lines up with the centerline of the support frame hole so as to minimize yaw effects. Flexure pivots are utilized in a dual purpose role; as bearings to support the pendulous mass and also as the accelerometer system calibrated force spring. The relatively long dimension of each flexure pivot coupled with the wide separation of the pivot pairs and their cross-axis rigidity provide high resistance to cross-axis vibrations, thus controlling an inherent sensitivity to cross-axis accelerations, a fundamental limitation of all pendulous accelerometers. The design combination of flexure pivots with the pendulous mass is such as to provide automatic span calibration. Zero adjustment is accomplished upon assembly of the instrument into the case and calibration is confined to adjustments of wiper contact loading and zero positioning. Allowable tolerance variations in the design do not permit beyond-limits movements as the total excursion of the mass is confined to approximately ±1.5 degrees. Theoretically, the cross-axis sensitivity is zero at the range center where the line connecting the center of gravity of the mass and the bearing center is perpendicular to the plane generated by the mounting surface.

It is important to keep in mind, while analyzing the device of the present invention, that a major unique feature of the invention is the use of a pair of flexure pivots to serve the dual purposes of supportive, friction-free bearings for a mass that rotates centrally through an aperture in a frame and also as the calibrated acceleration sensing spring.

BRIEF DESCRIPTION OF THE DRAWINGS

Further advantages and features of the present invention will be more fully apparent to those skilled in the art to which the invention pertains from the ensuing detailed description thereof, regarded in conjunction with the accompanying drawings, wherein like reference characters refer to like parts throughout and in which:

FIG. 1 is a plan view showing the arrangement of the elements in the accelerometer of the invention.

FIG. 2 is a side elevation, partly cut away for clarity, showing the orientation of the parts of the accelerometer from the profile perspective.

FIG. 3 is an enlarged detail emphasizing the spherically-shaped edge surface of the cylindrical pendulous mass showing how a constant annular air flow passageway to the trapped fluid adjacent the mass is provided during movement of the pendulous mass.

DETAILED DESCRIPTION

Although specific embodiment of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Referring to FIG. 1 with greater particularity, the accelerometer of the invention is shown without its protective case in order to provide study of its working parts. The top of the housing case 10, through which electrical connectors 12 are secured, is shown at the top of the figure. In the embodiment of the invention selected for illustration, a wiper lift-off mechanism is shown and comprises a solenoid coil 14, solenoid armature and spring assembly 16, and a wiper restraining bracket 18. This wiper lift-off mechanism forms no part of the invention here contemplated and has been included merely for completeness.

The signal pick-off device is shown as a potentiometer 20 comprising a resistance element 21, a wiper contact 22 and a wiper arm and spring 24 attached to a wiper bracket 26. The pendulous mass assembly comprises the pendulous mass itself, 30, and the mass mounting bracket 28 which attaches to the mass 30 by means of securing screws 32. Securing screws 34 retain flexure pivot bearings 46 (FIG. 2) in the flexure pivot retaining brackets 52 provided therefor in the support structure 42. A flexible cable 38 is provided for the purpose of communicating electrical intelligence concerning the position of the mass by means of the connectors 12. An armature stop 40 is provided to limit the travel of the armature of the wiper lift-off mechanism described heretofore.

Referring now to FIG. 2, the interior casing structure may be examined in greater detail. The interior casing structure comprises the casing structure top 50 to which is attached casing structure and mass travel limiting stop 44, attached in turn to casing structure bottom 54. Bottom support 48 is a limiting stop which rests against the bottom of the housing (not shown) when the instrument is assembled into its protective housing.

Referring now to FIG. 3, the spherically-shaped edge surface 56 of pendulous mass 30 is emphasized in its relation to the casing structure top 50 showing how a constant annular fluid flow passageway is maintained when the mass 30 rotates in response to an applied acceleration.

Referring again to FIGS. 1 and 2 and considering a linear acceleration applied in FIG. 2 in the direction of arrow 8 toward FIG. 1, the operation of the accelerometer may be further explained. The cased unit should be mounted on a moving system so that its sensitive direction is aligned in the direction of movement. The potentiometer resistance element 21 is mounted transversely on the rotationable mass 30 while the contacting wiper 22 is attached to the stationary frame support structure 42. The flexure pivots 46 serve dual purposes; i.e., as support bearings for the pendulous mass assembly and as the accelerometer calibrated force spring. The design of the flexures and the mass together provide automatic span calibration. The pendulous mass 30 is in the form of a short cylinder with most of its mass symmetrically distributed about its center of gravity which lines up with the centerline of the central hole in frame 42. The overhang of the mass mounting bracket 28 helps to counterbalance the center of gravity of the mass 30 at the centerline of the frame 42. In summary, it may be seen that the accelerometer comprises a short cylindrical pendulous mass 30 supported by a pair of flexure pivots 46 through attachment of the pendulous mass 30 to a mass mounting bracket 28. When the pendulous mass assembly comprising mass mounting bracket 28 and mass 30 rotates centrally through the opening in support structure 42, the cross strips flexure pivots 46 act not only as bearings but also as the calibrated acceleration sensing spring. The spherically-shaped edge surface 56 of the cylindrical mass 30 provides a constant annular fluid flow passageway to the trapped fluid behind the mass 30 during its rotary movements as may be seen from an analysis of FIG. 3. The volume of fluid trapped and the resistance of the passageway provide critical damping.

As the case accelerates in the direction of arrow 8, the lagging mass 30 changes the position of the resistance element 21 with respect to the wiper contact 22, thus producing a change in the resistance ratio which in turn modifies an electrical signal if a voltage has been applied. The instrument may be calibrated to provide a voltage ratio directly proportional to the acceleration input along the sensitive axis and such that with the unit at rest, the mass 30 is subjected to a gravitational force of 1 g with the wiper contact 22 touching at the midpoint of the resistance element 21. The electrical output, then, would be 50% applied voltage ratio. As the lagging mass 30 moves in response to an applied acceleration against the restraining flexure pivots 46, it causes the resistance element 21 to move across the wiper 22, thus varying the applied voltage ratio as a function of applied acceleration.

Thus, there has been described a flexure pivot accelerometer that will respond primarily in one axis only. Flexure pivots have been utilized in the dual roles of support bearings and calibrated force spring. Great improvements in reliability, flexibility, maintainability, and ease of calibration have been provided through the novel advantages of the invention.

It is pointed out that although the present invention has been shown and described with reference to particular embodiment, nevertheless various changes and modifications obvious to one skilled in the art to which the invention pertains are deemed to lie within the purview of the invention.

What is claimed and desired to be secured by Letters Patent of the United States is:

1. A pendulous linear accelerometer comprising:
   a pendulous mass assembly;
   a pair of flexure pivot bearings supporting said pendulous mass assembly;
   flexure pivot bearing retaining bracket means to secure said pair of flexure pivot bearings in a casing structure;
   a linear resistance element, linear both electrically and mechanically, attached to said pendulous mass assembly;
   a wiper contact attached to said casing structure so as to be operable along the linear dimension of said resistance element;
   a wiper arm and spring supporting said wiper contact for regulating and maintaining design contact pressure between the wiper contact and the resistance element;
   a solenoid and wiper lift-off mechanism for preventing contact between the wiper and the resistance element during periods of nonuse, itself comprising;
   a solenoid coil;
   a solenoid armature and spring mounted in operational relationship to said solenoid coil; and
   a wiper restraining bracket arranged to lift said wiper contact from said resistance element during a predetermined state of excitation of said solenoid coil.

* * * * *